April 14, 1964 W. W. ERVIN 3,129,349
COMMUTATOR AND COMMUTATOR CONNECTIONS CONSTRUCTION
Filed Sept. 16, 1960 2 Sheets-Sheet 1

INVENTOR.
William W. Ervin
BY
C. R. Meland
His Attorney

April 14, 1964  W. W. ERVIN  3,129,349
COMMUTATOR AND COMMUTATOR CONNECTIONS CONSTRUCTION
Filed Sept. 16, 1960  2 Sheets-Sheet 2

INVENTOR.
William W. Ervin
BY
C. R. Meland
His Attorney

United States Patent Office 3,129,349
Patented Apr. 14, 1964

3,129,349
COMMUTATOR AND COMMUTATOR CONNECTIONS CONSTRUCTION
William W. Ervin, Alexandria, Ind., assignor to General Motors Corporation, Detroit, Mich., a corporation of Delaware
Filed Sept. 16, 1960, Ser. No. 56,423
10 Claims. (Cl. 310—234)

This invention relates to dynamoelectric machine armatures and to the method of manufacturing the same.

One of the objects of this invention is to provide an armature wherein an annular mass of cured plastic material encompasses the armature conductors at a point adjacent the commutator to prevent breakage of the armature conductors at this point.

Another object of this invention is to provide a dynamoelectric machine armature wherein the armature conductors are press-fitted within commutator slots to make a good electrical connection between the conductors and the commutator and are held in place within the commutator slots by a mass of cured plastic material.

A further object of this invention is to provide a method of manufacturing an armature having armature conductors which are encompassed by an annular ring of plastic material the steps comprising, heating the armature, rotating the armature while applying a stream of plastic material to the armature over a prescribed area and then heating the coated armature to cure the plastic material.

Still another object of this invention is to provide a method of securing an armature conductor in a commutator slot, the steps comprising, staking an insulated conductor with a press-fit in a commutator slot to rupture the conductor insulation and provide a good electrical connection between the conductor and commutator and then applying a quantity of plastic material to the slot and conductor which serves when cured to hold the conductor in place.

Further objects and advantages of the present invention will be apparent from the following description, reference being had to the accompanying drawings wherein preferred embodiments of the present invention are clearly shown.

Figure 1:
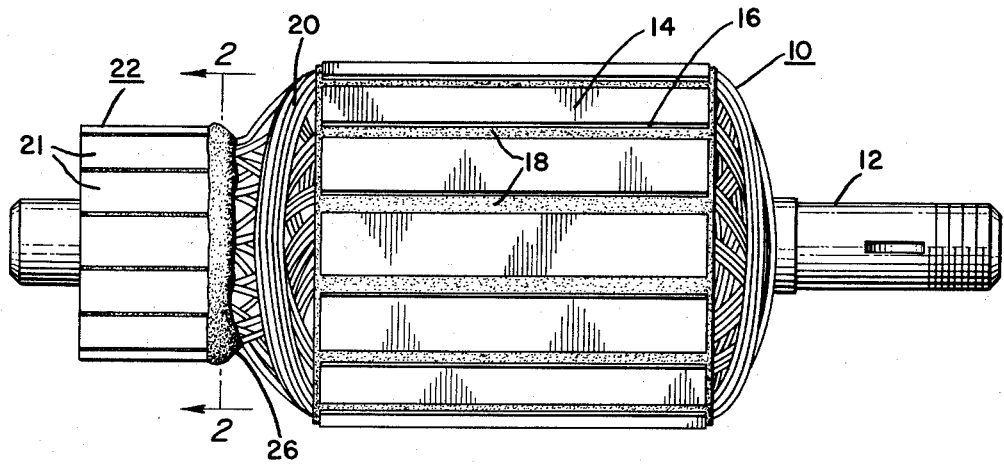
FIGURE 1 is a side elevation of an armature made in accordance with this invention.

Referring now to the drawings and more particularly to FIGURE 1, the reference numeral 10 generally designates an armature for a dynamoelectric machine. In this case, the armature is intended for use in a direct current generator of a type that is commonly used on motor vehicles. It will be apparent, however, that the present invention can be used on any rotating electrical element where it is desired to reduce breakage of conductors on an armature or rotor.

The armature 10 illustrated in FIGURE 1 includes a shaft 12 and the usual armature core 14 formed of steel laminations that are secured to and carried by the shaft 12. The armature core has the usual slots 16 which are filled with conductors and a rope wedge 18. The armature winding is generally designated by reference numeral 20 and it is seen that this winding, as in conventional practice, is made up of many conductors which pass through the armature core slots 16 and which are wound as illustrated in FIGURE 1.

The reference numeral 22 generally designates a commutator which is of conventional construction and which is formed of a plurality of commutator segments 21 each of which has a notch or slot that receives two of the armature end conductors that form the armature winding 20.

Figure 2:
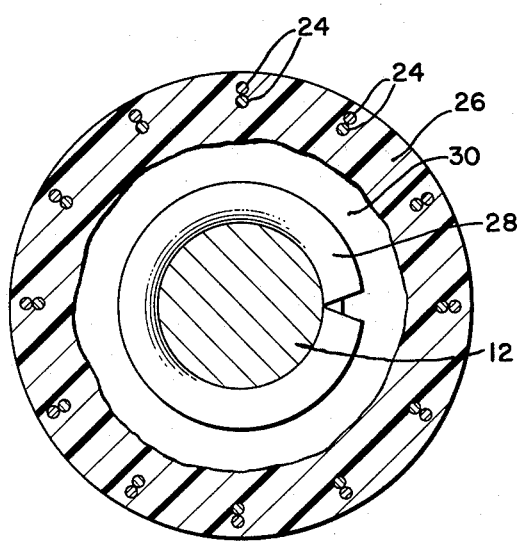
FIGURE 2 is an enlarged sectional view taken along line 2—2 of FIGURE 1.

The armature conductors that enter the slots in the segments of the commutator 22 are designated by reference numeral 24 in FIGURE 2. It can be seen that these armature conductors 24 are encompassed by an annular mass of plastic material generally designated by reference numeral 26. This plastic material is positioned closely adjacent one end of the commutator 22 and may contact the end faces of the segments which make up the commutator 22. It can be seen that this mass of plastic material will have a tendency to distribute stress and thus serves to reduce breakage of the armature conductors 24 at their point of entry into the notches formed in the segments of the commutator 22.

As will become more readily apparent hereinafter, the mass of plastic material 26 not only serves to encompass and bind together the armature conductors 24 but also serves to secure these conductors in place within the slots formed in the commutator segments. It is to be pointed out, however, that the conductors 24 could be soldered to the commutator segments and the ring of plastic material 26 applied thereto to reduce breakage of the armature conductors.

It is pointed out that the annular mass of plastic material 26 is of such a radial dimension that it only covers the end faces of the commutator segments 21. In other words, this plastic substance does not cover the commutator core member 28 and does not cover the V-ring 30. It thus is seen that only a minimum amount of plastic material is used and that this amount is just sufficient to encompass the armature conductors 24 at their point of entry into the slots of the commutator segments 21 to prevent breakage of the conductors.

In manufacturing the armature of FIGURE 1, an assembly is provided which includes the shaft 12 the armature core 14 and the commutator 22. In other words, an unwound armature assembly is provided which is then wound with conductors to form the winding 20. The winding may be applied to the armature core 14 by any suitable arrangement, but it is preferred in performing the method of this invention that the conductors 24 be staked into the commutator slots as the winding progresses in order to fracture the insulation that is on the conductors. The winding and staking may take place on a machine shown in copending application Serial No. 840,193, filed September 15, 1959.

Figure 3:
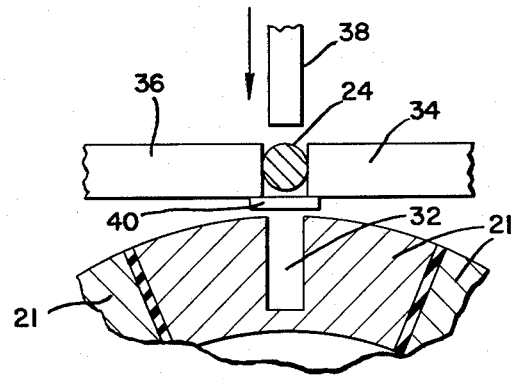
FIGURE 3 illustrates a staking operation which is one of the operations performed while using the method of this invention to secure a lead wire to a commutator segment.

The method of staking the conductors into a commutator slot is depicted in FIGURE 3. In FIGURE 3, the reference numeral 21 once more designates a commutator segment whereas the reference numeral 32 has been used to designate a slot in the commutator segment. The reference numeral 24 in FIGURE 3 designates an armature conductor which may be formed of copper material having a thin insulating coating of nylon or other plastic substance. The reference numerals 34 and 36 designate gripping means which hold the armature conductor 24 in a position over the commutator slot 32. When the conductor 24 is held in this position, it may be driven into the commutator slot by downward movement of a staking blade 38, the conductor being sheared off by a cutting device designated by reference numeral 40. In performing the staking operation of FIGURE 3, it is of primary importance that the conductor 24 have a larger diameter than the width of the commutator slot 32 so that the conductor 24 will have a press-fit in the commutator slot 32 once it is driven into this slot and the term staking is used herein in that sense. When the staking blade comes down, the plastic insulation on the conductor 24 is ruptured and, since there is a press-fit between the conductor and the commutator slot, a good electrical connection is made between the conductor 24 and the commutator segment 21. It will, of course, be apparent to those skilled in the art that all of the commutator segments 21 will have slots similar to those designated by reference numeral 32 and that in this particular case, two conductors are preferably staked within each commutator slot 32.

When the armature has been completely wound with conductors and all of the leads have been staked into the slots of the commutator segments, the entire armature assembly is then pre-heated for approximately thirty minutes at a temperature of 350° F.

Figure 4:
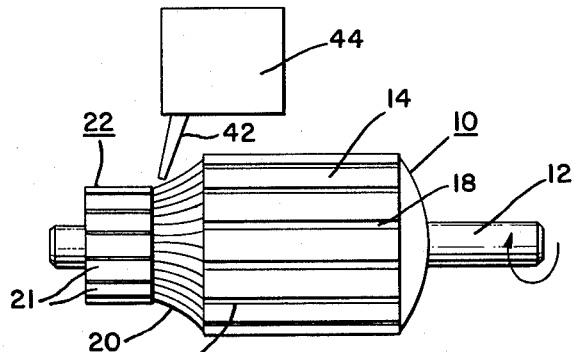
FIGURE 4 illustrates a method of applying a plastic substance to an armature adjacent the commutator.

After the armature has been so preheated, the armature is placed in a suitable fixture and is rotated at approximately 30 r.p.m. in a manner illustrated in FIGURE 4. During this rotation, a stream of a plastic substance is applied to the area adjacent the commutator from a spout 42 that is fed from the container 44 that serves as the supply of the plastic substance.

The plastic substance that is applied to the area adjacent the commutator is preferably of an epoxy composition. This composition may be formulated from one hundred parts of a liquid resin that is basically a reaction product of epichlorhydrin bisphenol A that has a molecular weight of 350. This liquid resin preferably has an epoxide equivalent of 175 to 210 and has a viscosity at 25° C. of 40 to 100 poises. The Gardner color (1933) is approximately 8 maximum and the liquid resin has a weight of approximately 9.7 pounds per gallon at 20° C.

The one hundred parts of the just described resin is mixed with 75 parts of an asbestos fiber, one part of pyromellitic dianhydride and 20 parts of a hardener of the aromatic amine type. Both the pyromellitic dianhydride and the aromatic amine serve as hardeners. The liquid epoxy resin of which 100 parts are used may be purchased from the Shell Oil Company and is identified as Shell Epon 820 and is fully described in the Shell Technical Bulletin "SC-5618."

As shown in FIGURE 4, the armature 10 is rotated at approximately 30 r.p.m. for two revolutions and the epoxy resin is then applied via spout 42 to the area immediately adjacent the commutator 22 to form the annular mass of material which is shown in FIGURES 1 and 2. As the epoxy resin is applied to the armature conductors, it will run down into the slots in the commutator segments and thus serve to bond the conductors to the walls of the slots when the resin is cured.

After the epoxy resin compound has been applied to the armature assembly in a manner illustrated in FIGURE 4, the entire armature assembly is then placed in an oven and heated for approximately one hour at 325° F. This will cure the epoxy resin and form a hard mass of epoxy compound which is designated by reference numeral 26 in FIGURES 1 and 2.

Figure 5:
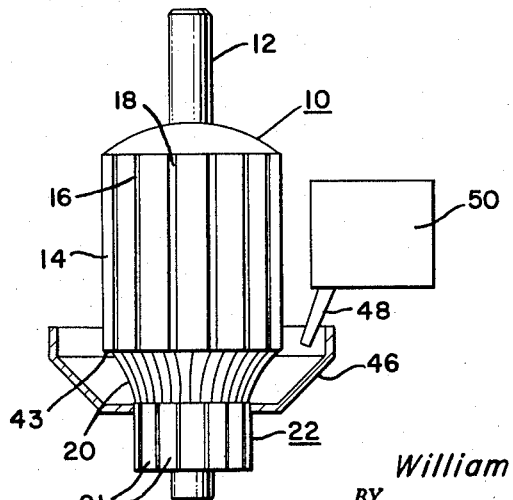
FIGURE 5 illustrates another method of applying a plastic substance to the end conductors of an armature.

Referring now to FIGURE 5, a method is illustrated wherein the armature conductors may be encapsulated with an epoxy resin compound between the commutator 22 and the end 43 of the armature core 14. In the method of FIGURE 5, a mold 46 is employed, and this mold is supplied with the epoxy resin compound from a spout 48 that is fed from the source 50. In using the method of FIGURE 5, all of the conductors located between the end 43 of the armature core and the commutator slot 22 will be encompassed by the epoxy resin compound to once more reduce breakage of these conductors.

It is pointed out that the mass of epoxy resin 26, when in a cured condition, serves to prevent breakage of the armature conductors at their point of entry into the commutator and also holds the conductors in place within the commutator slots. There is no soldering operation therefore required. If the conductors are, however, soldered to the commutator segments, the annular mass of epoxy resin still performs a very useful function in preventing armature conductor breakage.

While the embodiments of the present invention as herein disclosed constitute preferred forms, it is to be understood that other forms might be adopted.

What is claimed is as follows:

1. An armature for a dynamoelectric machine comprising, a shaft, an armature core carried by said shaft, a commutator carried by said shaft, an armature winding carried by said core having conductors fitted within slots formed in the segments of said commutator, and an annular mass of plastic material encompassing said conductors adjacent said commutator and bonding said conductors to the internal walls of the commutator slots, said mass of material serving to prevent breakage of said conductors and forming the sole bonding means for holding said conductors in place with respect to said commutator.

2. An armature for a dynamoelectric machine comprising, a shaft, a slotted armature core carried by said shaft, a commutator carried by said shaft including a plurality of commutator segments each formed with a commutator slot, an armature winding carried by said armature core having end conductors press-fitted within said commutator slots, and an annular mass of plastic material formed of an epoxy resin composition encompassing said armature conductors adjacent the end faces of said commutator segments and at least partially filling said commutator slots to bond said armature conductors to said commutator segments, said mass of plastic material forming the sole bonding means for securing the conductors to said commutator segments.

3. In a method of manufacturing a dynamoelectric machine armature, the steps comprising, providing an armature assembly including a shaft that carries a slotted armature core and a commutator, applying turns of wire to the slots of the armature core, substantially simultaneously severing an armature conductor and staking a length of said armature conductor into a slot formed in said commutator, heating the armature assembly with the wound armature coils and staked lead wires, rotating said armature assembly around its longitudinal axis while substantially simultaneously flowing an epoxy resin material onto the armature conductors over an area adjacent the commutator, and then heating said armature assembly to cure said epoxy resin compound.

4. A method of securing a lead wire to a segment of a commutator, the steps comprising, press-fitting the lead wire into a commutator slot to provide a good electrical connection between the commutator segment and the lead wire and then applying an epoxy resin compound over said commutator slot and conductor.

5. In a method of securing a lead wire to a slotted commutator segment, the steps comprising, staking the lead wire into the commutator slot with a press-fit so as to form a good electrical connection between the lead wire and the commutator segment, heating said commutator and lead wire, applying a quantity of epoxy resin to said commutator slot and lead wire to at least partially fill said slot, and then heating said commutator segment and lead wire to cure said epoxy resin.

6. In a method of securing a coated armature conductor to a commutator segment, the steps comprising, rupturing the insulation on the armature conductor by forcing said conductor with a press-fit into a slot formed in the commutator segment, heating said commutator segment and conductor, applying a flowable epoxy resin compound to said wire and permitting the compound to flow into the commutator slot, and then heating said commutator segment and conductor to cure said epoxy resin compound.

7. In a method of manufacturing an armature for a dynamoelectric machine, the steps comprising, providing an armature assembly having a shaft that carries a slotted armature core and a commutator, applying coil windings to said core and staking conductor ends into slots formed in the commutator segments, heating the wound and staked armature assembly, rotating said armature assembly around its longitudinal axis while simultaneously applying a stream of a flowable epoxy compound to said armature conductors immediately adjacent the end faces of the commutator segments, and then heating said coated armature assembly to cure said epoxy resin compound.

8. An armature for a dynamoelectric machine comprising, a shaft, a slotted armature core carried by said shaft, a commutator carried by said shaft including a plurality of metal commutator segments each formed with a commutator slot, an armature winding carried by said armature core having end conductors press-fitted within said commutator slots to tightly engage the internal walls of said commutator slots, and an annular mass of plastic material encompassing said armature conductors adjacent the end faces of said commutator segments and at least partially filling said commutator slots to bond said armature conductors to the internal walls of said commutator slots, said mass of plastic material forming the sole bonding means for securing the conductors to said commutator segments.

9. A method of securing an insulated lead wire to a slotted segment of a commutator, the steps comprising, press-fitting the lead wire into a commutator slot to rupture the insulation and to therefore provide a good electrical connection between the internal walls of the commutator segment slot and the portion of the lead wire which has the ruptured insulation and then applying a plastic compound over said commutator slot and conductor and into said slot to bond said lead wire to the internal walls of said commutator slot.

10. A method of securing an insulated lead wire to a segment of a commutator, the steps comprising, press fitting the lead wire into a commutator slot by means of a staking blade, rupturing a short section of the insulation on said lead wire during the staking operation to provide a direct metal to metal contact between the lead wire and the internal walls of the commutator slot and then applying a plastic compound over said commutator slot and conductor.

References Cited in the file of this patent

UNITED STATES PATENTS

| | | |
|---|---|---|
| 2,188,170 | Zschau | Jan. 23, 1940 |
| 2,831,991 | Perkins | Apr. 22, 1958 |
| 2,897,385 | Powell | July 28, 1959 |
| 2,923,640 | Buckingham | Feb. 2, 1960 |